US011674815B2

(12) United States Patent
Sese et al.

(10) Patent No.: US 11,674,815 B2
(45) Date of Patent: Jun. 13, 2023

(54) ROUTE GENERATION BASED ON STATED PURPOSE OF ROUTE TRAVERSAL

(71) Applicant: International Business Machines Corporation, Armonk, NY (US)

(72) Inventors: Jocelyn Sese, Knightdale, NC (US); Ashley Kristin Silva, Durham, NC (US); Randy A. Rendahl, Raleigh, NC (US); Frank Isaacs, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 16/741,736

(22) Filed: Jan. 13, 2020

(65) Prior Publication Data

US 2021/0215496 A1 Jul. 15, 2021

(51) Int. Cl.
*G01C 21/34* (2006.01)
*G06Q 10/047* (2023.01)
*G06N 20/00* (2019.01)
*G01C 21/36* (2006.01)

(52) U.S. Cl.
CPC ..... *G01C 21/3484* (2013.01); *G01C 21/3415* (2013.01); *G01C 21/3446* (2013.01); *G01C 21/3617* (2013.01); *G06N 20/00* (2019.01); *G06Q 10/047* (2013.01)

(58) Field of Classification Search
CPC ............ G01C 21/3484; G01C 21/3415; G01C 21/3446; G01C 21/3617; G01C 21/3697; G06N 20/00; G06Q 10/047
See application file for complete search history.

(56) References Cited

U.S. PATENT DOCUMENTS

| 8,090,532 B2 | 1/2012 | Tashev et al. |
| 8,655,591 B2 | 2/2014 | Hende |
| 10,024,675 B2 | 7/2018 | Schlesinger et al. |
| 2010/0211304 A1 | 8/2010 | Hwang et al. |

(Continued)

OTHER PUBLICATIONS

"Route Loops", https://www.routeloops.com/, retrieved Jan. 6, 2020.

(Continued)

*Primary Examiner* — Russell Frejd
*Assistant Examiner* — Ana D Thomas
(74) *Attorney, Agent, or Firm* — Jeffrey S LaBaw; Randy F Tejeda; Anthony V England (57) ABSTRACT

A method for route generation based on a stated purpose of an activity, implemented by a computer system, includes: receiving, by the computer system, a route request from a user device, the route request including an activity to be performed during a route traversal, a purpose of the activity, and a user identifier associated with a user of the user device; in response to receiving the route request, obtaining, by the computer system, a set of user preferences associated with the user identifier from a user profiles database; identifying, by the computer system, a set of route candidates with route attributes matching the activity, the purpose of the activity, and at least one of the user preferences; and outputting, by the computer system to the user device, one or more recommended route candidates from the set of route candidates based on the matching.

20 Claims, 6 Drawing Sheets

(56) References Cited

U.S. PATENT DOCUMENTS

2011/0270517 A1* 11/2011 Benedetti ................ H04W 4/18
                                                                    715/730
2013/0054141 A1     2/2013  Paluszek et al.
2014/0108137 A1     4/2014  Kuri et al.
2017/0138754 A1*    5/2017  Rowley .............. G01C 21/3484
2019/0178672 A1     6/2019  Woolley

OTHER PUBLICATIONS

"Route Planner", https://www.plotaroute.com/routeplanner, retrieved Jan. 6, 2020.

Anonymous, "A System and Method for Personal (Data Based) Navigation Recommender", IPCOM0000244516D, ip.com, Dec. 17, 2015.

* cited by examiner

| ROUTE CATEGORIES | | |
|---|---|---|
| Attribute Category 401 | Attribute 402 | Attribute Value 403 |
| Ruggedness | Hilly | |
| | Mixed | |
| | Flat | |
| Wild animal activity | None | |
| | Some | Large |
| | | Small |
| | | Venomous |
| | | Nonvenomous |
| Dogs allowed | Yes | |
| | No | |
| | Quiet | |
| Noise | Noisy | |
| | Mixed | |
| Setting | Urban | Park |
| | | City |
| | Rural | |
| | Mixed | |
| Popularity | Crowded | |
| | Deserted | |
| | Mixed | |
| Surface | Paved | |
| | Dirt | |
| | Rocky | |
| | Mixed | |
| Trail quality | Good | No holes |
| | Fair | Few holes |
| | Poor | Numerous holes |
| Lighting | Lit | |
| | Not lit | |
| Sun exposure | Shade | |
| | No shade | |
| | Mixed | |
| Vehicles permitted | Yes | |
| | No | |
| Criminal activity | None reported | |
| | Some reported | Violent |
| | | Nonviolent |
| Dedicated bike lane | Yes | |
| | No | |

FIG. 4

| CORRELATIONS | | | | |
|---|---|---|---|---|
| Difficulty 501 | | Safety 502 | | |
| Easier 504 | Harder 505 | Safer 506 | Less Safe 507 | Neutral/Comfort 508 |
| Ruggedness: Flat 511 | Ruggedness: Mixed; Hilly | Wild animal activity: None | Wild animal activity: Some 541 | Small 542 |
| Setting: Urban 512 | Setting: Mixed; Rural | Setting: Urban 543 | Setting: Mixed; Rural | Park 544 |
| Surface: Paved 513 | Surface: Mixed; Dirt; Rocky | Popularity: Crowded; Mixed | Popularity: Deserted | |
| Trail Quality: Good 514 | Trail Quality: Fair; Poor | Surface: Paved | Surface: Mixed; Dirt; Rocky | |
| Sun exposure: Shade 515 | Sun exposure: Mixed; No Shade | Trail quality: Good | Trail quality: Fair; Poor | |
| Vehicles permitted: No 516 | Vehicles permitted: Yes | Lighting: Lit | Lighting: Not lit | |
| | | Sun exposure: Shade | Sun exposure: Mixed; No shade | |
| | | Vehicles permitted: No | Vehicles permitted: Yes | |
| | | Criminal activity: None reported | Criminal activity: some reported | |
| | | Dedicate bike lane: No | Dedicate bike lane: Yes | |

ROUTE GENERATION BASED ON STATED PURPOSE OF ROUTE TRAVERSAL

BACKGROUND

Many device applications are designed for plotting routes from a starting location to a destination location and selecting a preferred route based on certain parameters, such as avoiding tolls or highways, a constraint (e.g. shortest time or shortest distance), and/or to leaving or arriving by a certain time. In order to plot the routes, both the starting location and the destination location must be provided. When either location is not specified, these applications cannot plot routes. When a route is desired that is not based on a destination, these applications are not useful.

SUMMARY

Disclosed herein is a method for route generation based on a stated purpose of an activity to be performed during route traversal, and a computer program product and system as specified in the independent claims. Embodiments of the present invention are given in the dependent claims. Embodiments of the present invention can be freely combined with each other if they are not mutually exclusive.

According to an embodiment of the present invention, a method for route generation based on a stated purpose of an activity, implemented by a computer system, includes: receiving, by the computer system, a route request from a user device, the route request including an activity to be performed during a route traversal, a purpose of the activity, and a user identifier associated with a user of the user device; in response to receiving the route request, obtaining, by the computer system, a set of user preferences associated with the user identifier from user profile; identifying, by the computer system, a set of route candidates with route attributes matching the activity, the purpose of the activity, and at least one of the user preferences; and outputting, by the computer system to the user device, one or more recommended route candidates from the set of route candidates based on the matching.

DETAILED DESCRIPTION

Figure 1:
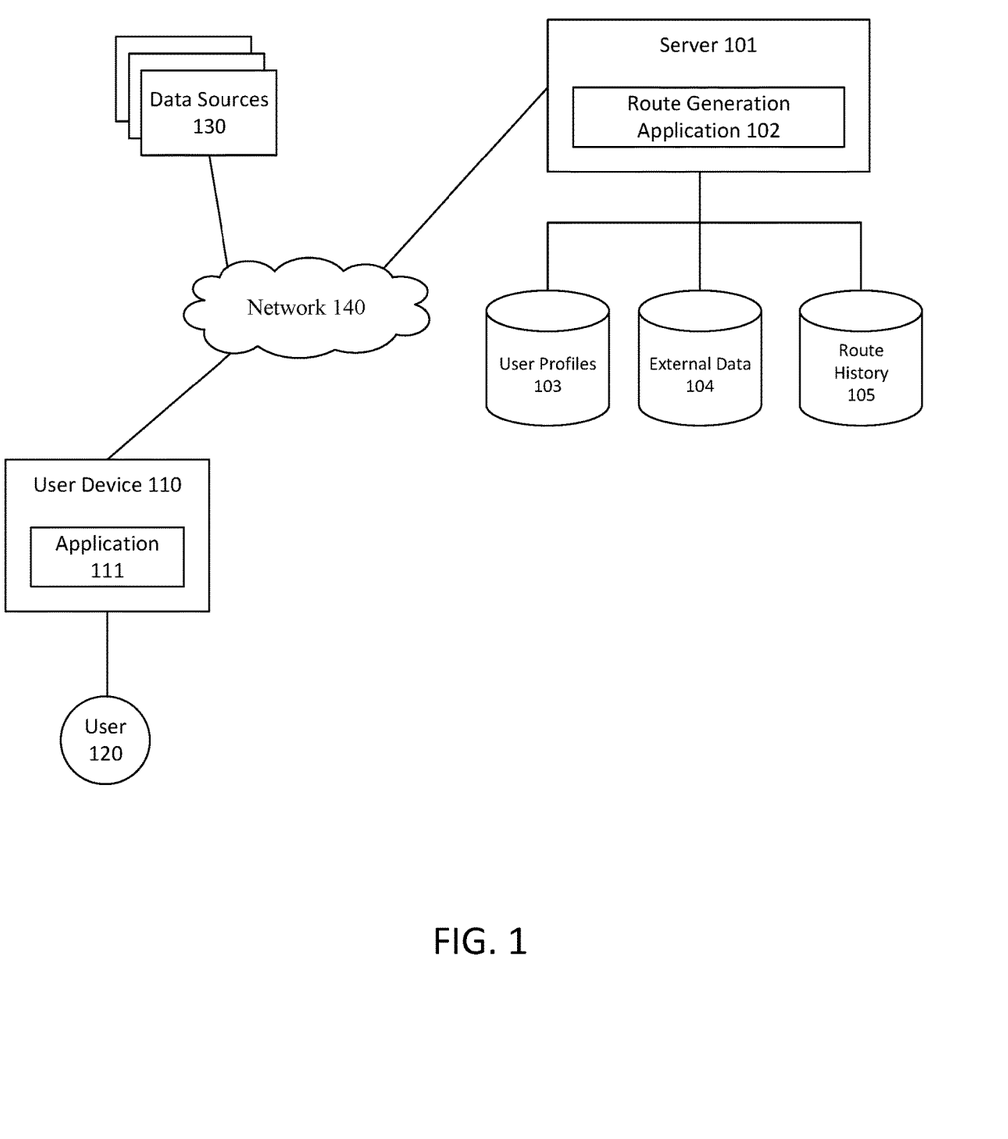
FIG. 1 illustrates an exemplary computing environment for route generation based on a stated purpose of an activity to be performed during route traversal, rather than based on a starting location and a destination location, according to some embodiments of the present invention.

FIG. 1 illustrates an exemplary computing environment for route generation based on a stated purpose of an activity to be performed during route traversal, rather than based on a starting location and a destination location, according to some embodiments of the present invention. The computing environment includes a server 101, implemented with one or more computer systems, described below with reference to FIG. 6. The server 101 executes a route generation application 102 that provides recommended routes, as described herein. The server 101 is coupled to an online user profile database 103 storing profiles of a plurality of users, an external data database 104 storing data from a plurality of internal and/or external data sources 130, and a route history database 105 storing a history of routes generated by the route generation application 102. The server 101 receives or subscribes to a plurality of data sources 130, possibly over a network 140. The server 101 is further coupled to a user device 110 over the network 110. The user device 110 is a computing device, such as the computing device 600 illustrated in FIG. 6, on which an application 111 executes. The user 120, through interfacing with the application 111, submits route requests from the route generation application 102, as described further below.

In some embodiments, the route generation application 102 requests data from the data sources 130 directly or subscribes to a data feed from which the routing service 102 receives data. In some embodiments, the route generation application 102 performs a "web crawl" in which an application is executed by the server 101 which automatically browses the Internet in order to obtain data. In some embodiments, the route generation application 102 obtains the data from the data sources 130 in a continual manner, without regard to whether a route request has been received from a user 120, i.e., "in the background". In some embodiments, the route generation application 102 obtains the data in response to receipt of a route request. The data obtains from the data sources 130 can be stored in the external data database 104. Data gathered from data sources 130 can include, but are not limited to: mapping data; street view video; crime reports and statistics; civil complaints; current weather; road conditions; traffic data; and census data.

Figure 2:
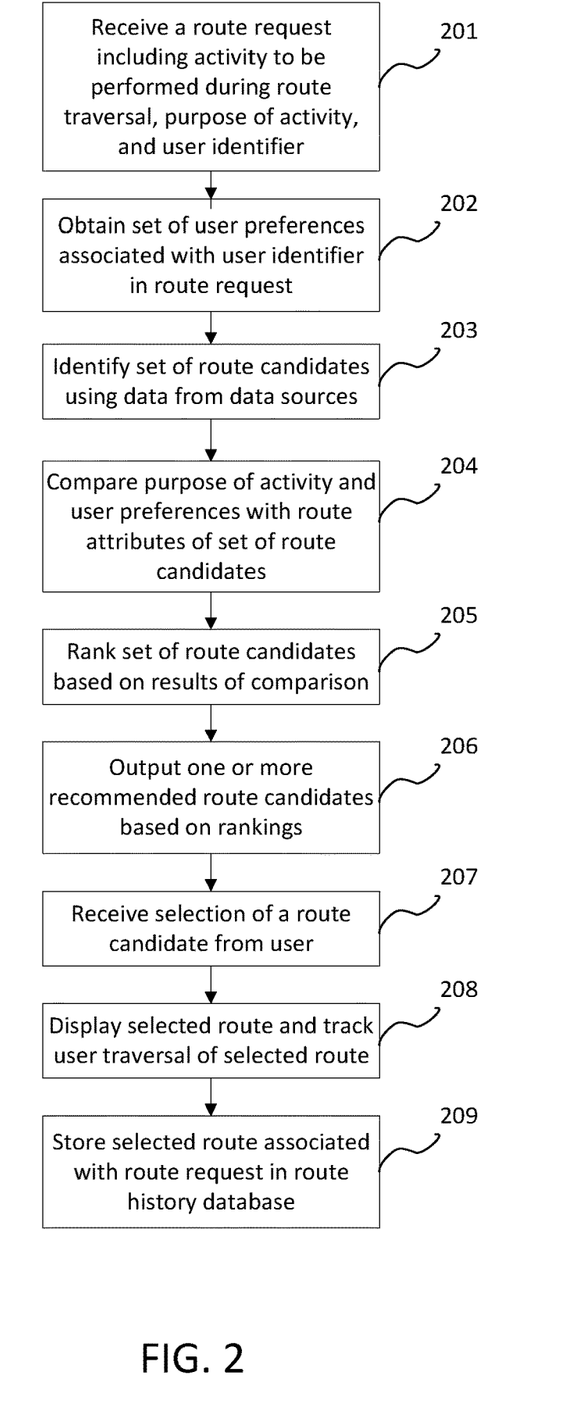
FIG. 2 illustrates an exemplary method for route generation based on a stated purpose of an activity to be performed during route traversal according to some embodiments of the present invention.

FIG. 2 illustrates an exemplary method for route generation based on a stated purpose of an activity to be performed during route traversal according to some embodiments of the present invention. A user 120, via an application 111 executing on a user device 110, requests a route and inputs an activity to be performed during the traversal of the route and the purpose of activity. For example, the activity to be performed can be, but is not limited to, a "walk", "jog", "bike", or "drive", and the purpose of the activity can be "relaxation", "distraction", "amusement", or "fitness". The application 111 generates a route request including the activity to be performed during the traversal of the route, the user's stated purpose of the activity, and a user identifier associated with the user 120. The application 111 sends the route request to the route generation application 102. The route generation application 102 receives the route request from the application 111 executing on the user device 110 (201). In response to receiving the route request, the route generation application 102 obtains a set of user preferences associated with the user identifier in the route request (202). In some embodiments, the route generation application 102 retrieves from the user profile database 103 the user profile associated with the user identifier. The user profile includes the set of user preferences associated with the user identifier. The set of user preferences stored in the user profile can be user-configured, extrapolated from a history of route requests associated with the same user identifier, and/or extrapolated from feedback on generated routes from the user 120 or other users of the route generation application 102. In some embodiments, in response to a user requesting a route, the application 111 prompts the user 130 for the user preferences, which can be in addition to or instead of the user preferences stored in the user profile. For example, the application 111 may display questions and answer options concerning the activity and the user's stated purpose of the activity. In some embodiments, the application 111 prompts the user 120 for additional activity parameters to further define the activity. For example, the application 111 can display questions asking the user whether the activity will be performed alone or in a group, with or without an animal, with or without a child and the age of the child, with or without a stroller, and whether the user 120 has any impediments (e.g. a physical injury).

Figure 4:
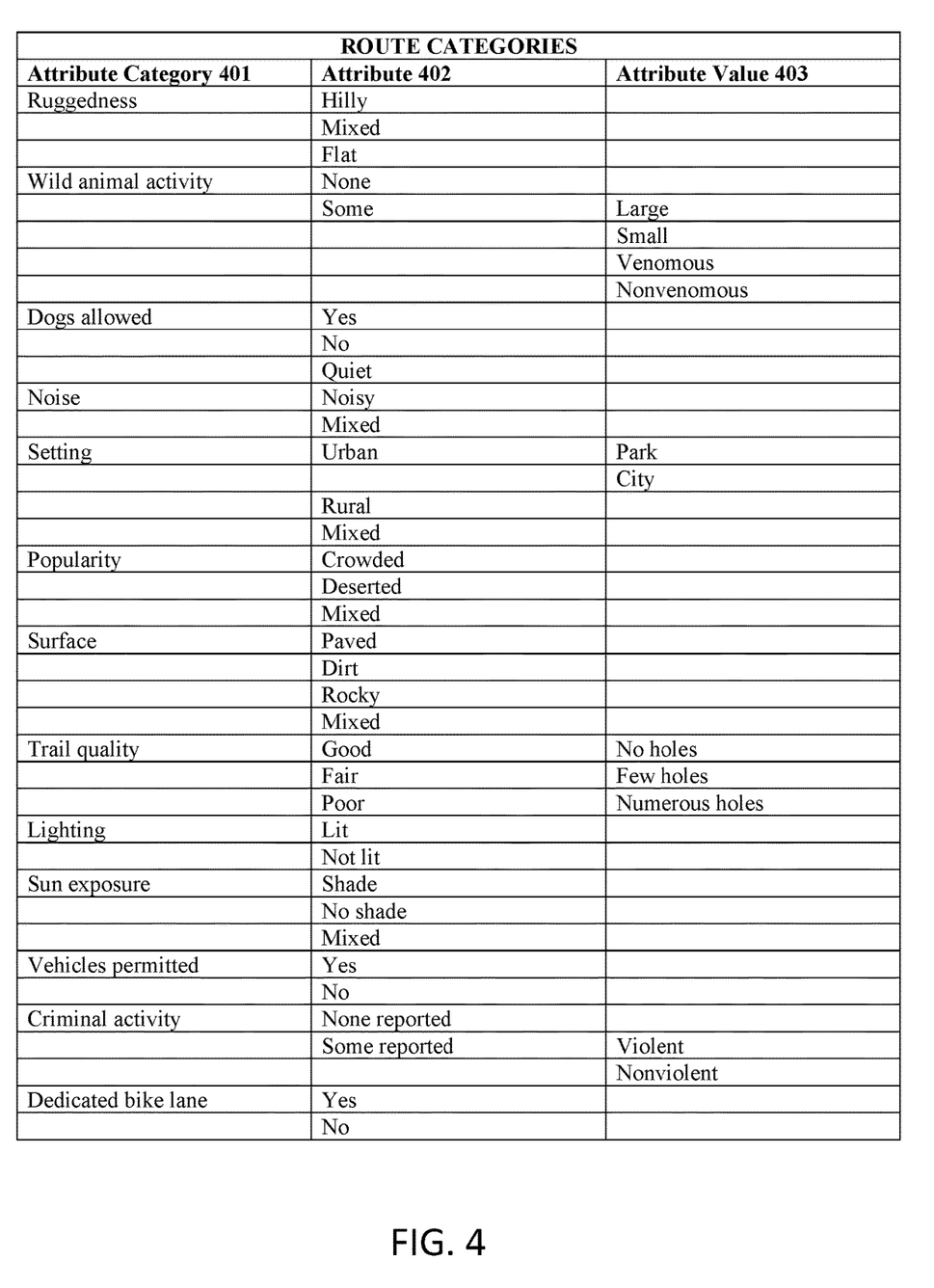
FIG. 4 illustrates example route attributes according to some embodiments.

In some embodiments, using the external data in the external data database 104, the route generation application 102 identifies a set of route candidates and calculates the route attributes for each route candidate in the set (203). FIG. 4 illustrates example route attributes according to some embodiments. In the illustrated example, each route attribute is associated with an attribute category 401. For example, the route generation application 102 executes an object recognition algorithm on images of geographic areas, and using a machine learning algorithm, identifies a plurality of the geographic areas that form a route candidate. The machine learning algorithm calculates the route attributes for the route candidate, such as whether the terrain in geographic areas in the route candidate is hilly, flat, or mixed. The route generation application 102 then sets a ruggedness attribute to "hilly", "flat", or "mixed". Additionally, the route generation application 102 processes data from law enforcement and determines whether no or some criminal activity has been reported along the route candidate. The route generation application 102 then sets a criminal activity attribute to "None reported" or "Some reported". When some criminal activity has been reported, the route generation application 102 can further process the data to determine whether the reported criminal activity is violent or nonviolent, and sets the attribute value 403 accordingly. The route generation application 102 compares the purpose of the activity and the set of user preferences with route attributes of a set of route candidates (204). The route generation application 102 ranks the set of route candidates based on the results of the comparison (205).

Figure 3:
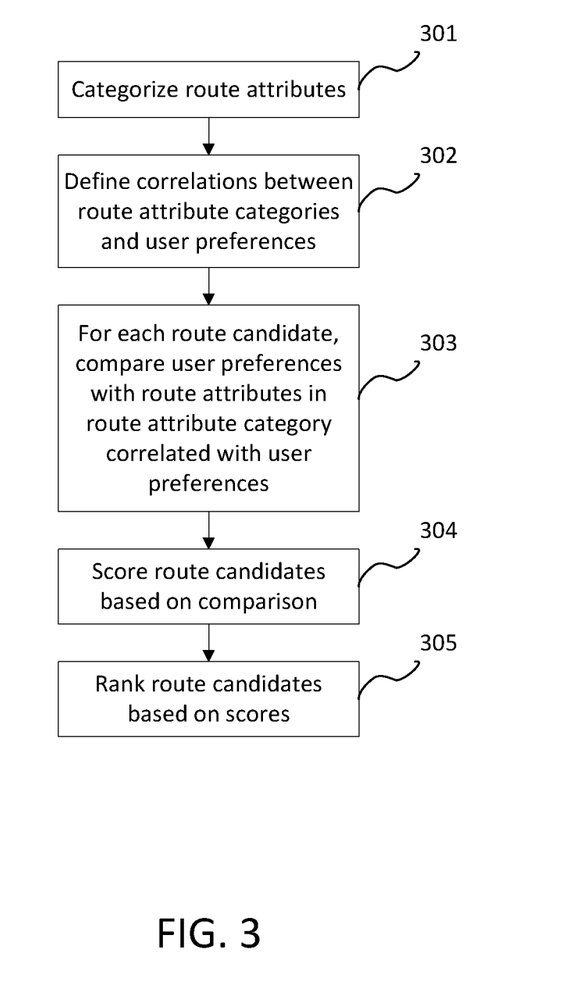
FIG. 3 illustrates an exemplary method for comparing the purpose of the activity and the set of user preferences with route attributes of a set of route candidates according to some embodiments.
Figure 5:
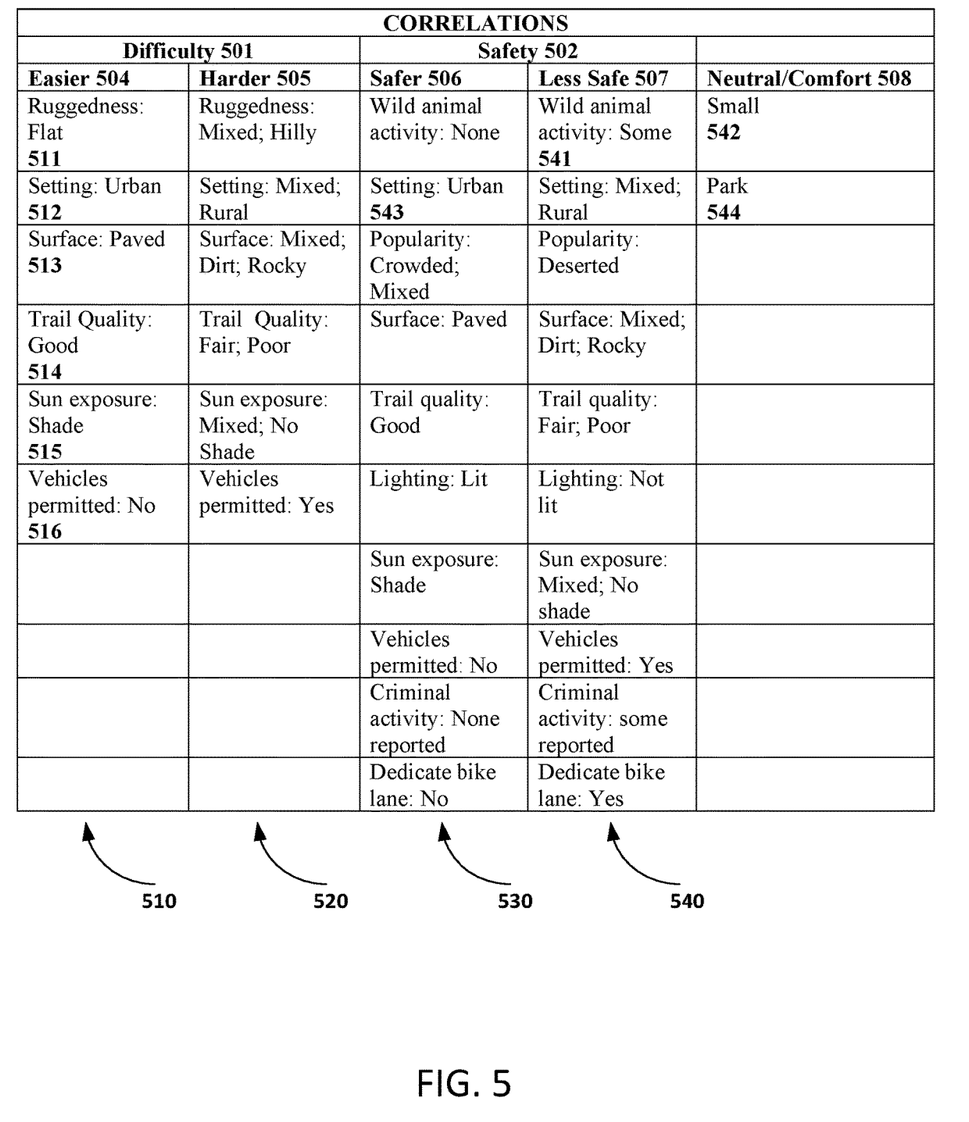
FIG. 5 illustrates example route attribute and user preference correlations according to some embodiments.

FIG. 3 illustrates an exemplary method for comparing the purpose of the activity and the set of user preferences with route attributes of a set of route candidates according to some embodiments. As illustrated in FIG. 4, the route attributes 402 are categorized into attribute categories 401 (301). Correlations between the route attributes categories and the user preferences are defined in the route generation application 102 (302). In some embodiments, the categorization of the route attributes and the correlations with the user preferences are pre-defined or pre-configured. FIG. 5 illustrates example route attribute and user preference correlations according to some embodiments. In the illustrated example, user preferences include "Difficulty" 501, "Safety" 502, and "Neutral/Comfort" 503. The Difficulty 501 user preference is defined as "Easier" 504 when the route attribute in the list of route categories 510 has some combination of the illustrated values. For example, Difficulty 501 is defined as "Easier" 504 when the Ruggedness category is "flat" 505, the Setting category is "Urban" 506, the Surface category is "Paved" 507, the Trail Quality category is "Good" 508, the Sun exposure category is "Shade" 509, and/or the Vehicles permitted category is "No" 510. In similar fashion, the Difficulty 501 user preference is defined as "Harder" 511 when the route attributes of the list of route categories 520 have some combination of the illustrated values, the Safety 502 user preference is defined as "Safer" 506 when the route attributes of the list 530 have some combination of the illustrated values, and the Safety 502 user preferences is defined as "Less Safe" 507 when the route attributes of the list 540 have some combination of the illustrates values. When a route attribute 402 is further defined with an attribute value 403 (see FIG. 4), an additional correlation with the user preference can be defined. For example, when the correlation with the Safety 502 user preference includes "Wild animal activity: Some" 541, the Safety 502 user preference can be further defined as "Neutral/Comfort" 508 when this route attribute has an attribute value of "Small" 542. Similarly, when the Safety 502 user preference includes the "Settings: Urban" 543, the Safety 502 user preference can be further defined as "Neutral/Comfort" 508 when this route attribute has an attribute value of "Park" 544. Using such user preference and route attribute category correlations, the route generation application 102 compares the user preferences the route request with the route attributes for each route candidate (303). The route generation application 102 scores the route candidates based on the comparison (304). In some embodiments, the scoring is calculated by counting the number of route attributes (e.g. 510, 520, 530, 540) that match each user preference value (e.g. 501, 502, 503). In some embodiments, the score is modified according to weights assigned to the user preferences stored in the user profile. The weights can be user configured or extrapolated based on a history of user feedback on prior generated routes, stored with the user profile in the user profile database 103. The route generation application 102 then ranks the route candidates based on the scores (305).

Returning to FIG. 2, the route generation application 102 outputs to the application 111 one or more recommended route candidates based on the rankings (206). In some embodiments, only the top ranked route candidate or a set of top ranked route candidates are output. In other embodiments, the route candidates with scores exceeding a preconfigured threshold are output. The application 111 displays the recommended route candidates to the user. The application 111 receives a selection of one of the recommended route candidates from the user (207), and in response, the application 111 displays the selected route and tracks the user traversal of the selected route (208). In some embodiments, upon receiving the selection of one of the recommended route candidates, the application 111 sends a second request to the route generation application 102 for details of the selected route. In response, the route generation application 102 sends the selected route details to the application 111 for display to the user 102. The route generation application 102 stores the selected route associated with the route request in the route history database 105 (209).

In some alternative embodiments, blocks 203-205 of FIG. 2 are replaced by a machine learning algorithm trained and configured to understand and learn the correlations and relationships between parameters concerning the generation of routes. Configured parameters can include, but are not limited to, external data, user preferences, user profiles, users' stated purpose of activities, user's emotional states, and user deviations from selected routes (described further below). In some embodiments, the machine learning algorithm is trained using some combination of a history of route requests, history of selected routes, and history of user feedback. In response to receiving the route request, the route generation application 102 obtains the set of user preferences associated with the user identifier in the route request per block 202 and inputs the activity, the user's stated purpose of the activity, and the set of user preferences into the machine learning algorithm. Data from the external data database 104 are also input into the machine learning algorithm. The machine learning algorithm identifies the route candidates using at least the external data from the external data database 104 and, using the configured and/or learned correlations and relationships between the parameters, calculates one or more optimal recommended route candidates.

In some embodiments, the route generation application 102 tracks the user's traversal of the selected route by tracking the movement of the user device 110. During the route traversal, the route generation application 102 optionally updates the selected route based on new or updated data received from one or more of the data sources 130. For example, the route generation application 102 parses new data from law enforcement that indicates that criminal activity has been reported at a location proximate to the selected route. The route generation application 102 determines that, based on this new data, the Safety 502 user preference has changed from "Safer" 506 to "Less Safe" 507. In response, the route generation application 102 identifies a modified or alternate route where the Safety 502 user preference is "Safer" 506. In this manner, real-time tracking of the route traversal is used to generate real-time modifications to the selected route. In some embodiment, in identifying the modified route, the route generation application 102 repeats the evaluation of route candidates per blocks 303-305 (FIG. 3). In other embodiments, the route generation application 102 uses the machine learning algorithm to identify the modified route. The updating of the selected route can also be due to other types of new or updated data, including but not limited to weather data or traffic data. In some embodiments, the new or updated data can be obtained from another application (not shown), such as a weather application, executing on the user device 110. Data sharing permissions can be configured between the application 111 and the weather application, and the data from the weather application is sent to the route generation application 102.

In some embodiments, in tracking the movement of the user device 110, the routing service 102 detects that the user device 110 has deviated from the select route. The route generation application 102 can send prompts to the application 111 to request from the user 120 information concerning the deviation, such as the reason the user chose to deviate. The user's response to the information request is then stored in the route history database 105 and/or with the user's profile in the user profile database 103. This information is input into the machine learning algorithm, which processes and learns from this information and can modify the user preferences for the user 120 and/or to the weights assigned to one or more of the user preferences to improve their accuracy. In this manner, the route generation application 102 learns, from the user's actual behavior during route traversal, what user preferences or route attributes are more important to the user. Over time, the machine learning algorithm's ability to recommend routes from which the user is less likely to deviate improves.

In some embodiments, upon completion of the route traversal, the application 111 prompts the user 120 for feedback concerning the selected, including how well the selected route met the user's stated purpose and/or user preferences. When the feedback indicates that the selected route did not meet the user's stated purpose, the application 111 further prompts the user for additional information on the reasons. This information is then conveyed to the route generation application 102 by the application 111. This information is input into the machine learning algorithm, which processes and learns from this information and can modify to the user preferences for the user 120 and/or to change weights assigned to one or more of the user preferences to improve their accuracy. In this manner, the machine learning algorithm learns, from the user's feedback, what route attributes and/or user preferences are more important to the user. Over time, the machine learning algorithm's ability to recommend routes that receive positive feedback from the user improves.

In some embodiments, the user 120 can begin traversal of a user-defined route prior to initiating the route request. Upon receiving the route request, the route generation application 120 generates outputs recommended routes proximate to the user's current location (or projected route trajectory) based on the user preferences, in the manner described above.

In some embodiments, the application 111 infers the activity based on the type of user device 110. For example, when the user device 110 is a smart watch, then the activity is less likely to be the driving of a vehicle, and the application 111 infers that the activity is either a walk or a jog. For another example, when the user device 110 is a tablet, then the activity is less likely to be a jog, and the application 111 infers that the activity is the driving of a vehicle.

In some embodiments, the route generation application 102 generates recommended routes in contexts other than for the user's personal activities. For example, the route generation application 102 is used by government or corporate entities to meet training goals, where the preferences include the terrain, lighting, setting, etc. related to the training goals.

Although the embodiments of the present invention are described above in the context of a machine learning algorithm, other artificial intelligence techniques may be used without departing from the spirit and scope of the present invention.

Figure 6:
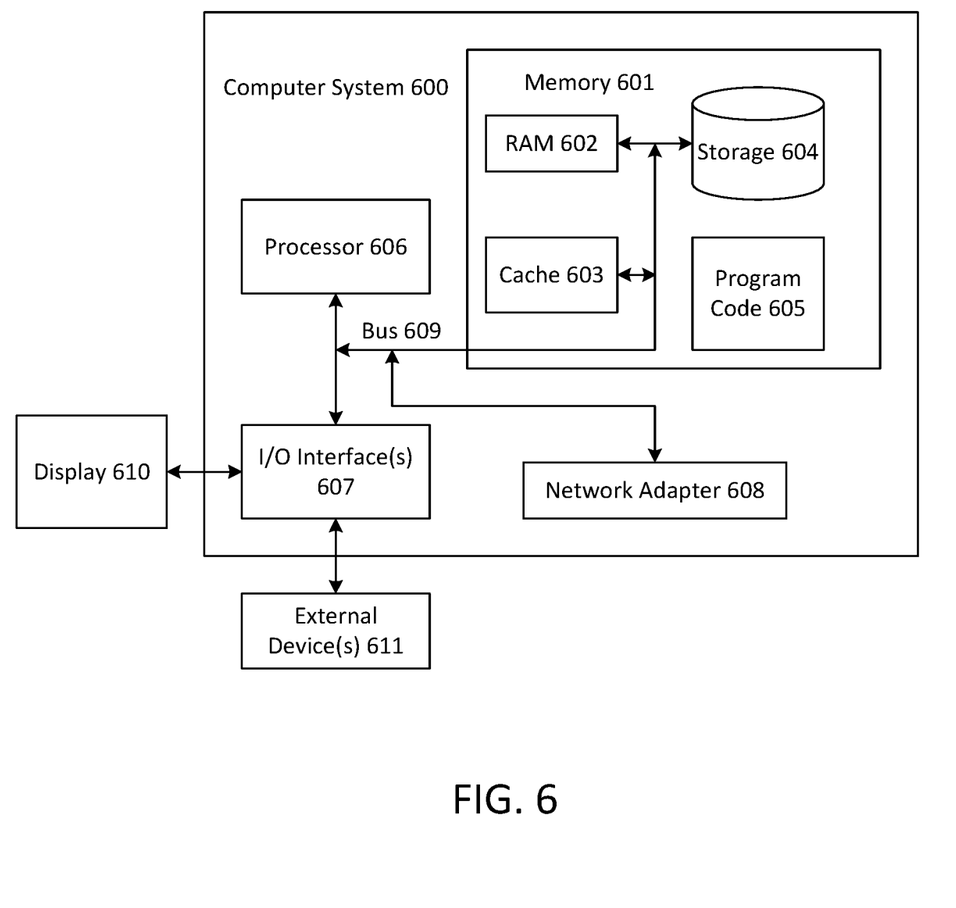
FIG. 6 illustrates a computer system according to some embodiments of the present invention.

FIG. 6 illustrates a computer system according to some embodiments of the present invention. The computer system 600 is operationally coupled to a processor or processing units 606, a memory 601, and a bus 609 that couples various system components, including the memory 601 to the processor 606. The bus 609 represents one or more of any of several types of bus structure, including a memory bus or memory controller, a peripheral bus, an accelerated graphics port, and a processor or local bus using any of a variety of bus architectures. The memory 601 may include computer readable media in the form of volatile memory, such as random access memory (RAM) 602 or cache memory 603, or non-volatile storage media 604. The memory 601 may include at least one program product having a set of at least one program code module 605 that are configured to carry out the functions of embodiment of the present invention when executed by the processor 606. The computer system 600 may also communicate with one or more external devices 611, such as a display 610, via I/O interfaces 607. The computer system 600 may communicate with one or more networks via network adapter 608.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for route generation based on a stated purpose of an activity, implemented by a computer system, comprising:
   receiving, by the computer system, a route request from a user device, the route request comprising an activity to be performed during a route traversal, a purpose of the activity, and a user identifier associated with a user of the user device;
   in response to receiving the route request, obtaining, by the computer system, a set of user preferences associated with the user identifier from a user profiles database;
   identifying, by the computer system, a set of route candidates with route attributes matching the activity from the route request, the purpose of the activity from the route request, and at least one of the user preferences from the user profiles database; and
   outputting, by the computer system to the user device, one or more recommended route candidates from the set of route candidates based on the matching.

2. The method of claim 1, wherein the identifying of the set of route candidates identifies a plurality of route candidates, each route candidate including a plurality of geographic areas and different from others of the set of route candidates, wherein the activity comprises a mode of transportation and the outputting of the one or more recommended route candidates comprise:
   identifying the set of route candidates, by the computer system, using data from one or more data sources;
   comparing, by the computer system, the purpose of the activity and the user preferences with the route attributes of each of the set of route candidates;
   ranking, by the computer system, the set of route candidates based on results of the comparing; and
   outputting, by the computer system, the one or more recommended route candidates based on the ranking.

3. The method of claim 2, wherein the comparing of the purpose of the activity and the user preferences with the route attributes and the ranking of the set of route candidates, each route candidate including a plurality of geographic areas and different from others of the set of route candidates, comprise:
   categorizing, by the computer system, the route attributes;
   defining, by the computer system, correlations between route attribute categories and the set of user preferences;
   for each route candidate in the set of route candidates, comparing, by the computer system, the set of user preferences with the route attributes in the route attribute categories correlated with the set of user preferences;
   scoring, by the computer system, the set of route candidates based on the comparing;
   ranking, by the computer system, the set of route candidates based on the scoring; and
   outputting the one or more route candidates having scores which exceed a threshold score.

4. The method of claim 1, wherein the identifying of the set of route candidates identifies a plurality of route candidates, each route candidate including a plurality of geographic areas and different from others of the set of route candidates and the outputting of the one or more recommended route candidates comprise:
   inputting, by the computer system, a plurality of parameters into a machine learning algorithm, the plurality of parameters comprising the activity, the purpose of the activity, the set of user preferences, and data from one or more data sources;
   identifying, by the machine learning algorithm executed by the computer system, the set of route candidates using at least the data from one or more data sources; and
   calculating, by the machine learning algorithm executed by the computer system, a set of optimal recommended route candidates, wherein the machine learning algorithm is configured with correlations and relationships between the plurality of parameters and the route attributes.

5. The method of claim 4, wherein after completion of the traversal of a selected route by the user device, the selected route being selected from the one or more recommended route candidates, the method further comprises:
   obtaining, by the computer system, feedback from the user concerning how well the selected route met the purpose of the activity;
   inputting, by the computer system, the feedback into the machine learning algorithm;
   processing the feedback, by the machine learning algorithm executed by the computer system; and
   modifying, by the machine learning algorithm executed by the computer system, one or more of the sets of user preferences according to the processing of the feedback.

6. The method of claim 1, further comprising:
   tracking, by the computer system, the traversal of a selected route by the user by tracking movements of the user device, the selected route being selected from the one or more recommended route candidates;
   detecting, by the computer system, a deviation from the selected route by the user device;
   obtaining, by the computer system, information from the user concerning reasons for the deviation; and
   storing, by the computer system, the information in a route history database.

7. The method of claim 5, further comprising:
   inputting, by the computer system, the information into a machine learning algorithm, wherein the machine learning algorithm is configured with correlations and relationships between a plurality of parameters, the plurality of parameters comprising the activity, the purpose of the activity, the set of user preferences, data from one or more data sources, and the route attributes;
   processing, by the machine learning algorithm executed by the computer system, the inputted information; and
   modifying, by the machine learning algorithm executed by the computer system, one or more of the set of user preferences based on the processing of the inputted information.

8. A computer program product for route generation based on a stated purpose of an activity, the computer program product comprising a computer readable storage medium having program instructions embodied therewith, the program instructions executable by a computer system to cause the computer system to:
   receive a route request from a user device, the route request comprising an activity to be performed during a route traversal, a purpose of the activity, and a user identifier associated with a user of the user device;

in response to receiving the route request, obtain a set of user preferences associated with the user identifier from a user profiles database;

identify a set of route candidates with route attributes matching the activity from the route request, the purpose of the activity from the route request, and at least one of the user preferences from the user profiles database; and output, to the user device, one or more recommended route candidates from the set of route candidates based on the matching.

9. The computer program product of claim 8, wherein the identifying of the set of route candidates identifies a plurality of route candidates, each route candidate including a plurality of geographic areas and different from others of the set of route candidates, wherein the activity comprises a mode of transportation and the outputting of the one or more recommended route candidates comprise:

identify the set of route candidates using data from one or more data sources;

compare the purpose of the activity and the user preferences with the route attributes of each of the set of route candidates;

rank the set of route candidates based on results of the comparing; and output the one or more recommended route candidates based on the ranking.

10. The computer program product of claim 9, wherein the comparing of the purpose of the activity and the user preferences with the route attributes and the ranking of the set of route candidates, each route candidate including a plurality of geographic areas and different from others of the set of route candidates, comprise:

categorize the route attributes;

define correlations between route attribute categories and the set of user preferences;

for each route candidate in the set of route candidates, compare the set of user preferences with the route attributes in the route attribute categories correlated with the set of user preferences;

score the set of route candidates based on the comparing; and rank the set of route candidates based on the scoring.

11. The computer program product of claim 8, wherein the identifying of the set of route candidates identifies a plurality of route candidates, each route candidate including a plurality of geographic areas and different from others of the set of route candidates and the outputting of the one or more recommended route candidates comprise:

input a plurality of parameters into a machine learning algorithm, the plurality of parameters comprising the activity, the purpose of the activity, the set of user preferences, and data from one or more data sources;

identify, by the machine learning algorithm, the set of route candidates using at least the data from one or more data sources; and calculate, by the machine learning algorithm, a set of optimal recommended route candidates, wherein the machine learning algorithm is configured with correlations and relationships between the plurality of parameters and the route attributes.

12. The computer program product of claim 11, wherein after completion of the traversal of a selected route by the user device, the selected route being selected from the one or more recommended route candidates, the computer system is further caused to:

obtain feedback from the user concerning how well the selected route met the purpose of the activity;

input the feedback into the machine learning algorithm;

process the feedback, by the machine learning algorithm; and modify, by the machine learning algorithm, one or more of the set of user preferences according to the processing of the feedback.

13. The computer program product of claim 8, wherein the computer system is further caused to:

track the traversal of a selected route by the user by tracking movements of the user device, the selected route being selected from the one or more recommended route candidates;

detect a deviation from the selected route by the user device;

obtain information from the user concerning reasons for the deviation; and store the information in a route history database.

14. The computer program product of claim 13, wherein the computer system is further caused to:

input the information into a machine learning algorithm, wherein the machine learning algorithm is configured with correlations and relationships between a plurality of parameters, the plurality of parameters comprising the activity, the purpose of the activity, the set of user preferences, data from one or more data sources, and the route attributes;

process, by the machine learning algorithm, the inputted information; and modify, by the machine learning algorithm, one or more of the set of user preferences based on the processing of the inputted information.

15. A system comprising:

a processor; and a computer readable storage medium having program instructions embodied therewith, the program instructions executable by a computer system to cause the processor to:

receive a route request from a user device, the route request comprising an activity to be performed during a route traversal, a purpose of the activity, and a user identifier associated with a user of the user device;

in response to receiving the route request, obtain a set of user preferences associated with the user identifier from a user profiles database;

identify a set of route candidates with route attributes matching the activity from the route request, the purpose of the activity from the route request, and at least one of the user preferences from the user profiles database; and output, to the user device, one or more recommended route candidates from the set of route candidates based on the matching.

16. The system of claim 15, wherein the identifying of the set of route candidates identifies a plurality of route candidates, each route candidate including a plurality of geographic areas and different from others of the set of route candidates, wherein the activity comprises a mode of transportation and the outputting of the one or more recommended route candidates comprise:

identify the set of route candidates using data from one or more data sources;

compare the purpose of the activity and the user preferences with the route attributes of each of the set of route candidates;

rank the set of route candidates based on results of the comparing; and output the one or more recommended route candidates based on the ranking.

17. The system of claim 15, wherein the identifying of the set of route candidates identifies a plurality of route candidates, each route candidate including a plurality of geographic areas and different from others of the set of route candidates and the outputting of the one or more recommended route candidates comprise:

input a plurality of parameters into a machine learning algorithm, the plurality of parameters comprising the activity, the purpose of the activity, the set of user preferences, and data from one or more data sources;

identify, by the machine learning algorithm, the set of route candidates using at least the data from one or more data sources; and calculate, by the machine learning algorithm, a set of optimal recommended route candidates, wherein the machine learning algorithm is configured with correlations and relationships between the plurality of parameters and the route attributes.

18. The system of claim 17, wherein after completion of the traversal of a selected route by the user device, the selected route being selected from the one or more recommended route candidates, the processor is further caused to:

obtain feedback from the user concerning how well the selected route met the purpose of the activity;

input the feedback into the machine learning algorithm;

process the feedback, by the machine learning algorithm; and modify, by the machine learning algorithm, one or more of the set of user preferences according to the processing of the feedback.

19. The system of claim 15, wherein the processor is further caused to:

track the traversal of a selected route by the user by tracking movements of the user device, the selected route being selected from the one or more recommended route candidates;

detect a deviation from the selected route by the user device;

obtain information from the user concerning reasons for the deviation; and store the information in a route history database.

20. The system of claim 19, wherein the processor is further caused to:

input the information into a machine learning algorithm, wherein the machine learning algorithm is configured with correlations and relationships between a plurality of parameters, the plurality of parameters comprising the activity, the purpose of the activity, the set of user preferences, data from one or more data sources, and the route attributes;

process, by the machine learning algorithm, the inputted information; and modify, by the machine learning algorithm, one or more of the set of user preferences based on the processing of the inputted information.

* * * * *